United States Patent [19]

Mack

[11] Patent Number: 4,656,928

[45] Date of Patent: Apr. 14, 1987

[54] APPARATUS FOR MOLDING AND COOKING MULTIPLE EGG PRODUCTS

[76] Inventor: Leegett Mack, 641 19th St., N.E., Washington, D.C. 20019

[21] Appl. No.: 866,502

[22] Filed: May 23, 1986

[51] Int. Cl.⁴ .............................................. A47J 37/04
[52] U.S. Cl. ........................................ 99/419; 99/416; 99/440; 426/92; 426/302; 426/515; 426/523; 426/614
[58] Field of Search ................. 99/403, 415, 416, 418, 99/419, 428, 439, 440, 426, 448; 426/89, 92, 104, 302, 523, 614, 515

[56] References Cited

U.S. PATENT DOCUMENTS

| | | | |
|---|---|---|---|
| 2,226,844 | 12/1940 | Carr | 99/440 X |
| 2,464,307 | 3/1949 | Griffin | 99/440 |
| 3,161,156 | 12/1964 | Batista | 99/440 X |
| 3,791,285 | 2/1974 | Mack | 99/419 |

FOREIGN PATENT DOCUMENTS 277553 9/1927 United Kingdom ................... 99/440

Primary Examiner—Billy J. Wilhite
Attorney, Agent, or Firm—Armstrong, Nikaido, Marmelstein & Kubovcik

[57] ABSTRACT

An apparatus for molding and cooking multiple egg products at one time has a plurality of egg-shaped cups. Each cup has a top section and a bottom section removably engageable with one another to form a hollow container. The top section has a hole on the top thereof, with said hole having at least one vent groove extending radially therefrom along the surface of the top section to allow venting of the interior of the cup even when the hole is covered. The bottom section has a spike extending centrally upward therein and the upper end of the spike terminates within the egg-shaped cup. Further, a lower support member is provided for supporting each of the bottom sections, while an upper support member is provided for supporting each of the top sections. A cover, attached to the upper support, is provided for covering the holes of the top section. Further, the upper support member and the lower support member are secured to one another such that the top and bottom sections of each egg-shaped cups fit together.

6 Claims, 7 Drawing Figures

APPARATUS FOR MOLDING AND COOKING MULTIPLE EGG PRODUCTS

BACKGROUND OF THE INVENTION

Field of the Invention

This invention relates to the formation of an egg product having a substitute yoke. In particular, this invention relates to an apparatus which is used to prepare a plurality of such egg products at the same time. An apparatus for molding and cooking a single egg products is disclosed in U.S. Pat. No. 3,791,285.

SUMMARY OF THE INVENTION

The present invention is directed to an apparatus for forming an egg product having a substitute yoke therein. The apparatus of the instant invention is capable of forming a plurality of such egg products at the same time. In the process used by the apparatus of the present invention, containers similar in size and shape to eggs are provided. Inside of each of these containers a spike is provided to hold a substitute product. The substitute product is suspended approximately in the center of the container, while egg whites may then be poured into the container thus filling up the cavity inside the container not already occupied by the substitute food material. The opening in the container into which the raw egg white is admitted is then sealed and the plurality of containers or egg-shaped cups contained in this apparatus are then submerged in boiling or very hot water. Thus the device cooks these egg whites and the substitute food material as hard boiled eggs.

The primary object of this invention is then to provide an apparatus which enables a plurality of egg products with a substitute egg yoke to be cooked at one time.

Specifically, an apparatus is provided for molding and cooking multiple egg products. The apparatus includes a plurality of egg-shaped cups, each of the cups having a top section and a bottom section removably engageable with one another to form a hollow container. The top section has a hole on the top thereof and each hole having at least one vent groove extending radially therefrom along the surface of the top section. The vent groove allows the venting of the interior of the cup, even when the hole is covered. The bottom section has a spike extending centrally upward therein and the spike has its upper end terminating within the egg shaped cup. Further, a lower support member is provided for supporting each of the bottom sections. An upper support member is provided for supporting each of the top sections. A cover means which is attached to the upper support member covers the hole on the top section of the egg-shaped cup. Also a means is provided for removably securing the upper support member to the lower support member such that the top and bottom sections of the egg-shaped cups fit together.

Thus when egg products are prepared using the apparatus of the above described invention, the egg products will be formed similar to hard boiled eggs with a surprise food material in the middle. The above set forth structure enables a plurality of such egg products to be prepared at one time, thus providing a substantial advantage over a single cup which may be prepared one at a time.

Other objects and advantages will become apparent in the following specification when considered in light of the attached drawings.

DESCRIPTION OF THE PREFERRED EMBODIMENTS

Figure 1:
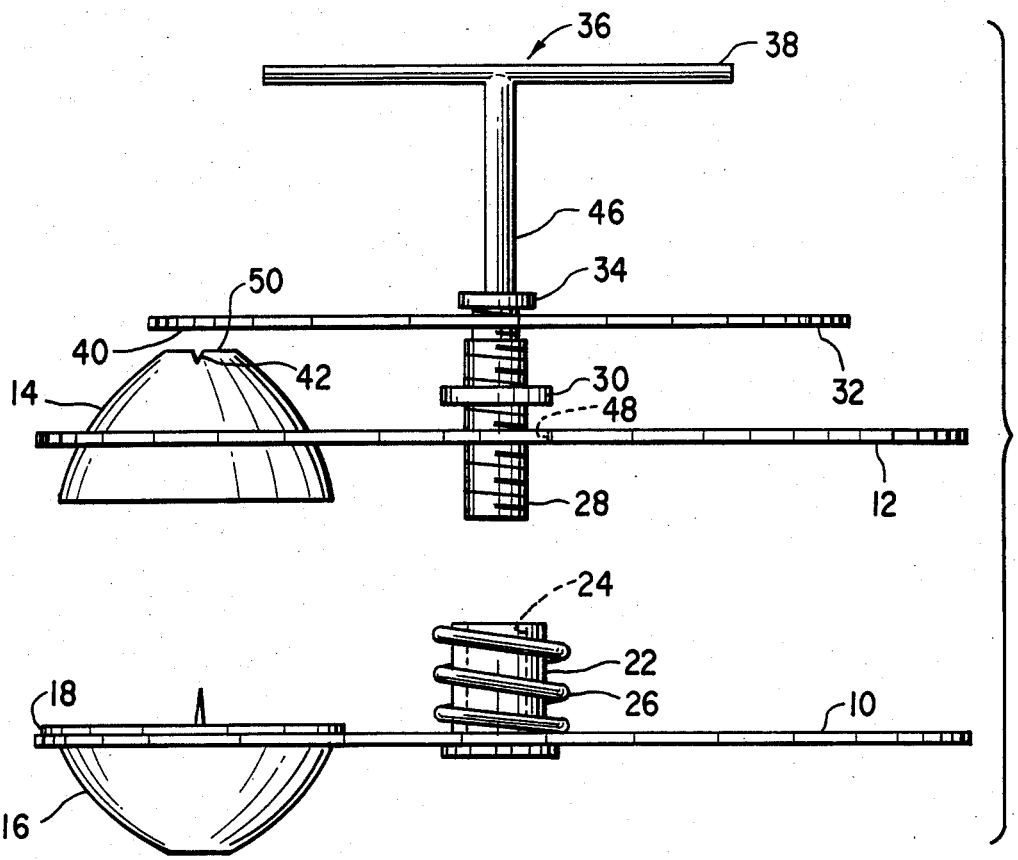
FIG. 1 is an elevational view of the apparatus of the instant invention in the disassembled state.
Figure 6:
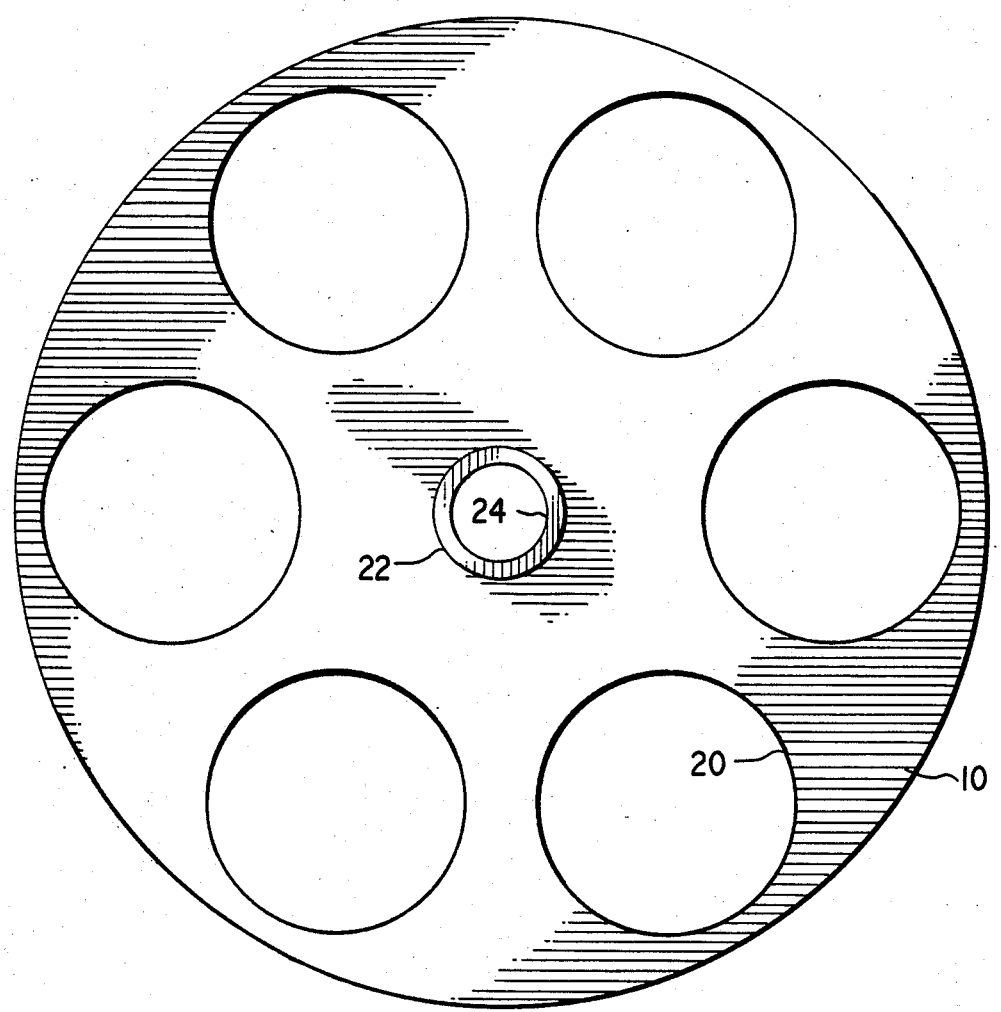
FIG. 6 is a plan view of the lower support plate shown in FIG. 1.

Referring now to the drawings, the instant invention will be described in detail. FIG. 1 is an elevational view of the device in accordance with the instant invention. In FIG. 1 a lower support member 10 is provided to support the bottom section 16 of the egg-shaped cup. The egg-shaped cup has a lip 18 for supporting the cup in the support member 10. As seen in FIG. 6, the lower support member 10 is provided with six cup receiving holes 20. Lower support member 10 is provided with a cylindrical projection 22 extending upwardly from and fixed to the center portion of lower support member 10 and having a threaded interior 24. A coil spring 26 is provided around the outside of projection 22.

Figure 5:
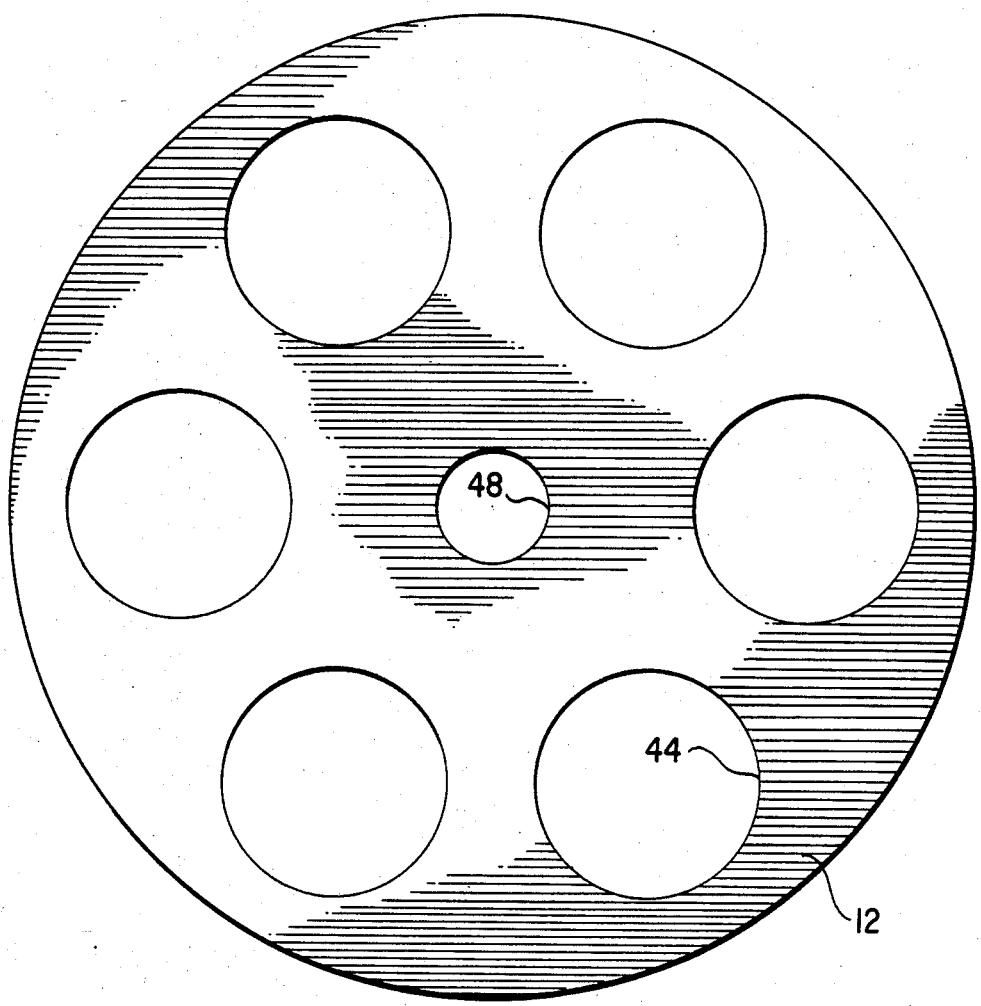
FIG. 5 is a plan view of the upper support plate shown in FIG. 1.

The lower support member 10 is provided with (as seen in FIG. 5) cup-receiving holes 44 for receiving the top sections 14 of the egg-shaped cups. The top section 14 may be friction fit into the cup receiving holes 44 or it may be welded or bonded thereto. Of course, any means may be provided for securing the top portion to the upper support member 12. The upper support member is positioned around a shaft 46 of the tightening handle 36. Specifically, the upper support member 12 may be movable with respect to the shaft member 46. At the lower portion of the shaft member 46 is provided a threaded bolt portion 28. A hole 48 in the center of the upper support member 12 is large enough to fit around the cylindrical projection 22 fixed to the lower support member 10. The threaded bolt 28 is provided to be threadable within the threads 24 of the cylindrical projection 22. A tightening nut 30 is provided to tighten the upper support member 12 toward the lower support member 10.

A cover 32 is provided above the upper support member 12. The cover 32 may be threaded around the threaded bolt 28 or it may have a central hole substantially large so that it moves up and down irrespectively of the threads. A further tightening nut 34 is provided to tighten the cover 32 down toward the upper support member 12 and thus onto the top portion of the top sections 14 of the cups. A portion 40 of cover 32 is provided to bear directly upon hole 50 on the top of the top section to the egg-shaped cup. Further, a vent groove 42 is provided extending radially outward from the hole 50 in order to provide a vent for the interior of the cup, even if the hole 50 is covered. Of course, several of the vents 42 may be provided circumferentially around said hole 50.

Figure 2:
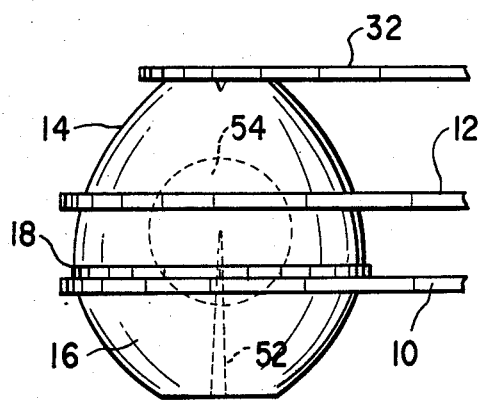
FIG. 2 is a fragmentary view of one egg-shaped cup with the apparatus in the assembled state.

FIG. 2 shows a fragmentary view of the portion of the apparatus of FIG. 1, in which the apparatus is assembled in its cooking position. In the device of FIG. 2, the threaded bolt 28 has been threaded into the cylindrical projection 22. Both the upper support member 12 and the cover 32 have been tightened down to their operating positions. In FIG. 2, a spike 52 shown in dotted lines is located centrally in the interior of the egg-shaped cup and extends generally upward from the bottom of the bottom section 16. The end of the spike terminates within the egg-shaped cup itself. Also shown in phantom is a substitute food material 54 formed in the shape of a ball. The substitute food material 54 is positioned on spike 52 before the raw egg white is poured into hole 50 to fill up the cavity around the food material.

Figure 3:
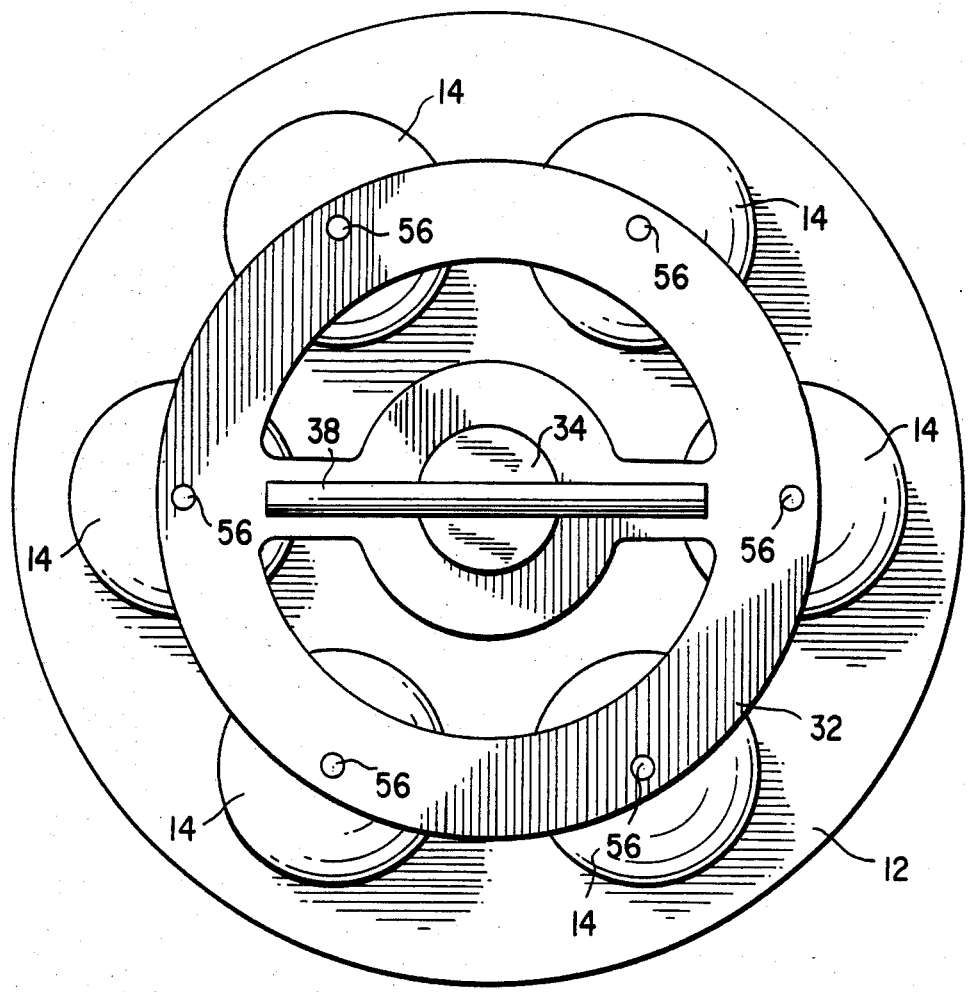
FIG. 3 is a top view of the apparatus of FIG. 1 in the assembled state.

FIG. 3 shows a top view of the device of FIG. 1. In FIG. 3, holes 56 are provided in cover 32 and are spaced circumferentially therearound. In the figure, holes 56 of the cover 32 register with holes 50 on the top of each top section 14 of the egg-shaped cups. Tightening nut 34 may be loosened to allow cover 32 to rotate around shaft 46. Cover 32 may be rotated sufficiently so that holes 56 no longer register with holes 50 of top sections 14. Thus the tightening nut 34 may be again tightened to seal the holes 50 on each of the top sections 14 of the egg-shaped cups.

Figure 4:
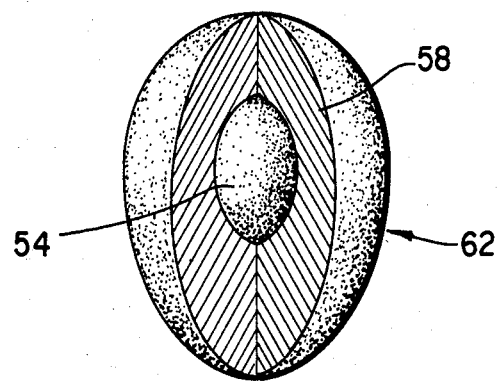
FIG. 4 is a partial cut-away view of an egg product with a food material serving as a substitute yoke.

FIG. 4 shows a partially cut away view of a finished egg product made using the invention set forth herein. In FIG. 4 a hard boiled egg-type food 62 is provided having cooked egg whites 58 as in a hard boiled egg and in the center thereof is found the substitute food material 54 instead of the egg yoke.

FIG. 5 is a plan view of upper support member 12. As can be clearly seen in FIG. 5, six cup-receiving holes 44 are circumferentially located around the upper support member 12. Further, a hole 48 is provided in the center thereof. Hole 48 can be sufficiently large so that it fits over the cylindrical projection 22 extending upwardly from lower support member 10.

FIG. 6 is a plan view of the lower support member 10. As can be seen in FIG. 6, the cup-receiving holes 20 are positioned around the circumferential portion of lower support member 10. Six holes 20 are provided in the embodiment shown in FIG. 6. Of course, the number of holes provided on the lower support member 10 and upper support member 12 need only be limited by the size of the egg-shaped cups and the size of the support members themselves. Further, cylindrical projection 22 is fixed in the center of lower support member 10 and has threads 24 in the interior thereof.

Figure 7:
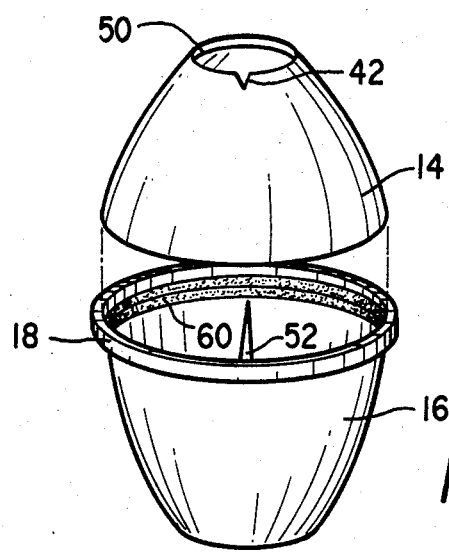
FIG. 7 is a perspective view of the top and bottom sections of a single egg-shaped cup.

FIG. 7 shows the top section and bottom section of the egg-shaped cup apart from the other elements of the invention. Specifically, seen in FIG. 7 is the hole 50 on the top of top section 14. The spike 52 is seen extending upwardly from the bottom section 16. A gasket 60 can be seen on the interior of lip 18 around the circumferential edge of bottom section 16. Gasket 60 may be used to provide a more complete seal between top section 14 and bottom section 16.

In operation, the upper support member 12 and lower support member 10 are disasembled in order to separate the top section 14 and bottom section 16 of each of the egg-shaped cups. Although only one cup is shown (for illustrative purposes) in FIG. 1, during operation, a cup should be used for each hole in the upper support member. A substitute food material 54 is place on spike 52 in each of the egg-shaped cups. The ball of food material 54 may be any desired edible substance such as meats, cheeses and the like. Upper support member 12, including the top sections 14 of each egg-shaped cup are then fitted down so that each top section of the cups fits into a corresponding bottom section. Tightening nut 30 is then tightened in order to bias upper support member 12 toward lower support member 10 to provide a secure fitting between each top section and bottom section of each cup. The raw egg white, previously separated from the yokes may then be poured into the hole 50 of each cup. Also, cover 32 may be secured to the tops of each top section 14 of the cups by tightening nut 34. Cover 32 may be shifted so that holes 56 disposed circumferentially therearound may register with holes 50 of each top section 14 of the egg cup. In this instance, if the raw egg white has not been poured into the egg cup previously, it may also be poured in through the holes 56 of cover 32, through hole 50 on the top of each egg cup into the egg cup. Then, cover 32 is angularly shifted so that holes 56 no longer register with holes 50. Then tightening nut 34 may again be tightened so that each hole 50 is fully covered by cover 32. It should be noted that vent groove 42 will still allow the venting of the interior of the egg-shaped cup. Each egg-shaped cup is filled and the holes 50 are covered, then the apparatus may be placed in a water bath or pot of hot water (not shown) to heat up the egg products. This would occur in the normal way one would boil an egg to be hard boiled. Thus after the apparatus has been in the boiling water for the specified time, the egg white is hard boiled by the water bath. The apparatus is then removed from the water bath and disassembled in the opposite manner as to how it was assembled as set forth above. The egg product 62 (as seen in FIG. 4) is then removed, and it can be eaten in the manner of a hard boiled egg. The egg white 58 has been hard boiled and provides a surprise yoke of substitute food material 54 in the center. It should be noted that the egg white may be seasoned as desired in the liquid stage prior to pouring into the egg cups for hard-boiling.

It should also be noted that the egg yoke need not be wasted, since it may be mixed with mayonnaise, mustard, salt and pepper to prepare a deviled egg product, for example, which may be mounted on the spike 52 and used as a substitute yoke. Furthermore, the yoke may be blended with the white of the egg and poured into the egg-shaped cup to surround the substitute yoke before the product is hard boiled.

The above description discloses a single embodiment of the invention. Numerous other embodiments can be contemplated without departing from the spirit of the invention. The invention should be considered in view of the following claims.

I claim:

1. An apparatus for molding and cooking multiple egg products, comprising:
    a plurality of egg-shaped cups, each of said cups having a top section and a bottom section removably engageable with one another to form a hollow container, said top section having a hole on the top thereof, each hole having at least one vent groove extending radially therefrom along the surface of said top section to allow venting of the interior of said cup even when said hole is covered, and said bottom section having a spike extending centrally upward therein and having its upper end terminating within said egg-shaped cup;
    a lower support member for supporting each of said bottom sections;

an upper support member for supporting each of said top sections;

a cover means attached to said upper support for covering the holes of said top section; and means for removably securing said upper support member to said lower support member such that said top and bottom sections of each of egg-shaped cups fit together.

2. The apparatus of claim 1, wherein a gasket is provided between said top section and said bottom section to form a leakproof seal therebetween.

3. The apparatus of claim 1, wherein said cover means has a plurality of through holes therein, and is shiftable with respect to said top sections of said cups such that said through holes corrspond to the holes in said top sections to allow liquid to be poured therein.

4. The apparatus of claim 1, wherein said securing means comprises a threaded member which cooperatively engages a threaded member on said lower support.

5. The apparatus of claim 4, further comprising a spring to bias said upper support member away from said lower support member.

6. The apparatus of claim 1, wherein said cover means is threadably adjustable on said upper support to bear directly on said cups or to be spaced apart from said cups.

* * * * *